(12) United States Patent
Tseng

(10) Patent No.: US 11,960,381 B2
(45) Date of Patent: Apr. 16, 2024

(54) MEMORY CHECK METHOD, MEMORY CHECK DEVICE, AND MEMORY CHECK SYSTEM

(71) Applicant: PHISON ELECTRONICS CORP., Miaoli (TW)

(72) Inventor: Chien Chang Tseng, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 165 days.

(21) Appl. No.: 17/200,910

(22) Filed: Mar. 15, 2021

(65) Prior Publication Data
US 2022/0269581 A1     Aug. 25, 2022

(30) Foreign Application Priority Data
Feb. 22, 2021   (TW) ................................. 110106098

(51) Int. Cl.
*G06F 11/36* (2006.01)
*G06F 11/30* (2006.01)
*G06F 11/32* (2006.01)

(52) U.S. Cl.
CPC ...... *G06F 11/3652* (2013.01); *G06F 11/3037* (2013.01); *G06F 11/321* (2013.01); *G06F 11/3656* (2013.01); *G06F 11/366* (2013.01)

(58) Field of Classification Search
CPC ............. G06F 11/3652; G06F 11/3037; G06F 11/321; G06F 11/3656; G06F 11/366

USPC ........................................................ 714/25
See application file for complete search history.

(56) References Cited

U.S. PATENT DOCUMENTS

2003/0204819 A1* 10/2003 Matsumoto ............. G06F 30/33
716/102
2011/0029953 A1*  2/2011 Pouyollon ........... G06F 11/3624
717/124

FOREIGN PATENT DOCUMENTS

TW            201616356         5/2016

OTHER PUBLICATIONS

Wikipedia "ICE" page from date Dec. 7, 2020, retrieved from https://web.archive.org/web/20201207204942/https://en.wikipedia.org/wiki/In-circuit_emulation. (Year: 2020).*

(Continued)

*Primary Examiner* — Yair Leibovich
(74) *Attorney, Agent, or Firm* — JCIPRNET

(57) ABSTRACT

A memory check method, a memory check device and a memory check system are disclosed. The method includes the following. A debug file is generated according to a source code, where the debug file carries symbol information related to a description message in the source code. Memory data generated by a memory storage device in execution of a firmware is received. The debug file is loaded to automatically analyze the memory data. In addition, an analysis result is presented by an application program interface, where the analysis result reflects a status of the firmware with assistance of the symbol information.

18 Claims, 4 Drawing Sheets

(56) References Cited

OTHER PUBLICATIONS

Wikipedia "source code" page, retrieved from https://en.wikipedia.org/wiki/Source_code (Year: 2023).*
Wikipedia "debugging" page, retrieved from https://en.wikipedia.org/wiki/Debugging (Year: 2023).*
Wikipedia "symbol" page, retrieved from https://en.wikipedia.org/wiki/Symbol_(programming) (Year: 2023).*
"Office Action of Taiwan Counterpart Application", dated Nov. 25, 2021, p. 1-p. 7.

* cited by examiner

```
                                    401
struct{
U8 MtpMT_t;
U8 Base[OPT_D_MTQ_BASE];
U8 Size[MTP_MT_SIZE];
     ⋮
}Cop0_MTQ;
     ⋮
```

MEMORY CHECK METHOD, MEMORY CHECK DEVICE, AND MEMORY CHECK SYSTEM

CROSS-REFERENCE TO RELATED APPLICATION

This application claims the priority benefit of Taiwanese application no. 110106098, filed on Feb. 22, 2021. The entirety of the above-mentioned patent application is hereby incorporated by reference herein and made a part of this specification.

BACKGROUND

Technical Field

The disclosure relates to a memory check technology; particularly, the disclosure relates to a memory check method, a memory check device, and a memory check system.

Description of Related Art

After memory storage devices are shipped out of a factory, in case of abnormality in a firmware (e.g., a boot code) of the memory storage devices, specific devices are generally required to be used to retrieve and analyze data in the memory storage device. For example, commonly seen memory data retrieving devices include an in-circuit emulator (ICE), which simulates operation of a processor and communicates naturally with the memory storage device. However, when in use, the in-circuit emulator requires to be directly connected to a motherboard where the memory storage device is installed and access the memory storage device through a communication port of the motherboard. Besides, the memory data retrieved by the in-circuit emulator can only be analyzed by the in-circuit emulator per se, which lacks flexibility in use and is not applicable to increasingly popular remote debugging operations.

SUMMARY

The disclosure provides a memory check method, a memory check device and a memory check system, in which work efficiency in performing a firmware check on a memory storage device is increased.

In an exemplary embodiment of the disclosure, a memory check method is provided, which is adapted to check a firmware in a memory storage device. The memory check method includes the following. A debug file is generated according to a source code, where the debug file carries symbol information related to a description message in the source code. Memory data generated by a memory storage device in execution of a firmware is received. The debug file is loaded to automatically analyze the memory data. In addition, an analysis result is presented by an application program interface, where the analysis result reflects a status of the firmware with assistance of the symbol information.

In an exemplary embodiment of the disclosure, in the step where the debug file is generated according to the source code, the source code is processed by a compiler to generate the debug file, and the symbol information is not presented in machine language or assembly language.

In an exemplary embodiment of the disclosure, the memory check method further includes the following. An adjustment command issued by a user is received by the application program interface. At least a part of firmware codes in the firmware is updated according to the adjustment command.

In an exemplary embodiment of the disclosure, a memory check device is also provided, which is adapted to check a firmware in a memory storage device. The memory check device includes a storage circuit and a processor. The storage circuit is configured to store a source code and a debug file. The processor coupled to the storage circuit. The processor is configured to generate the debug file according to the source code. The debug file carries symbol information related to a description message in the source code. The processor is further configured to receive a memory data generated by the memory storage device in execution of the firmware. The processor is further configured to load the debug file to automatically analyze the memory data. The processor is further configured to present an analysis result by an application program interface. The analysis result reflects a status of the firmware with assistance of the symbol information.

In an exemplary embodiment of the disclosure, the memory check device further includes an input/output interface. The input/output interface is coupled to the processor. The processor receives the memory data by the input/output interface from the memory storage device.

In an exemplary embodiment of the disclosure, the processor is further configured to receive an adjustment command issued by a user by the application program interface. The processor is further configured to update at least a part of firmware codes in the firmware according to the adjustment command.

In an exemplary embodiment of the disclosure, a memory check system is also provided, which includes a memory storage device and a host system. The memory storage device has a firmware. The host system is coupled to the memory storage device. The host system is configured to generate a debug file according to a source code. The debug file carries symbol information related to a description message in the source code. The host system is further configured to receive a memory data generated by the memory storage device in execution of the firmware. The host system is further configured to load the debug file to automatically analyze the memory data. The host system is further configured to present an analysis result by an application program interface. The analysis result reflects a status of the firmware with assistance of the symbol information.

In an exemplary embodiment of the disclosure, the operation where the debug file is generated according to the source code includes the following. The source code is processed by a compiler to generate the debug file, and the symbol information is not presented in machine language or assembly language.

In an exemplary embodiment of the disclosure, the symbol information is configured to associate the description message in the source code with a specific symbol in the firmware.

In an exemplary embodiment of the disclosure, the memory data is obtained from reading at least one memory module in the memory storage device by a simulation circuit coupled to the memory storage device.

In an exemplary embodiment of the disclosure, the simulation circuit includes an in-circuit emulator.

In an exemplary embodiment of the disclosure, the memory data is received by the host system from the memory storage device.

In an exemplary embodiment of the disclosure, the host system is further configured to receive an adjustment command issued by a user by the application program interface. The host system is further configured to update at least a part of firmware codes in the firmware according to the adjustment command.

Based on the foregoing, the debug file may be generated according to the source code. In particular, the debug file may carry symbol information related to the description message in the source code. After the memory data generated by the memory storage device in execution of the firmware is received, the debug file may be executed to automatically analyze the memory data. Next, the analysis result may be presented by the application program interface to reflect the status of the firmware with assistance of the symbol information. Thereby, work efficiency in performing a memory check on the memory storage device is increased.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
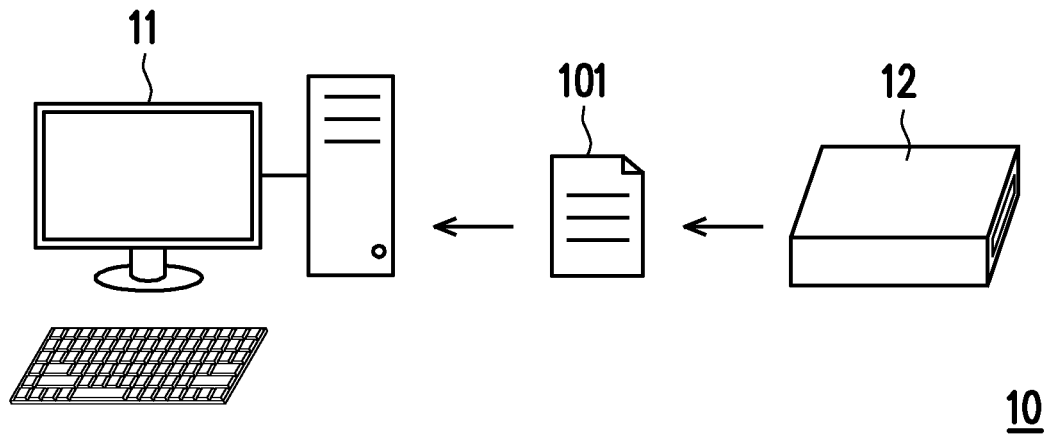
FIG. 1 is a schematic diagram showing a memory check system according to an exemplary embodiment of the disclosure.

FIG. 1 is a schematic diagram showing a memory check system according to an exemplary embodiment of the disclosure. With reference to FIG. 1, a memory check system 10 includes a host system 11 and a memory storage device 12. The host system 11 is configured to perform a check on a firmware in the memory storage device 12. For example, the firmware may include a boot code installed in the memory storage device 12 and/or other firmware codes required during operation of the memory storage device 12. For example, the check includes debugging, modifying, or adjusting at least a part of firmware codes of the firmware in the memory storage device 12. For example, the host system 11 may include notebook computers, desktop computers, tablet computers, industrial computers, servers, or the like, among other computer systems with capability of computation. In an exemplary embodiment, the host system 11 is also referred to as a firmware check device or a memory check device.

The memory storage device 12 may include a flash drive, a memory card, a solid state drive (SSD) or a wireless memory storage device. Besides, the memory storage device 12 may include embedded storage devices in various forms, such as embedded Multi-Media Card (eMMC), embedded Multi-Chip Package (eMCP) storage devices, or the like, in which the memory modules are directly coupled to the motherboard.

In an exemplary embodiment, the host system 11 may receive memory data 101 generated by the memory storage device 12 in execution of the firmware. That is, the memory data 101 may reflect an execution result of the firmware on the memory storage device 12. The host system 11 may automatically analyze the memory data 101 to check the firmware in the memory storage device 12.

Figure 2:
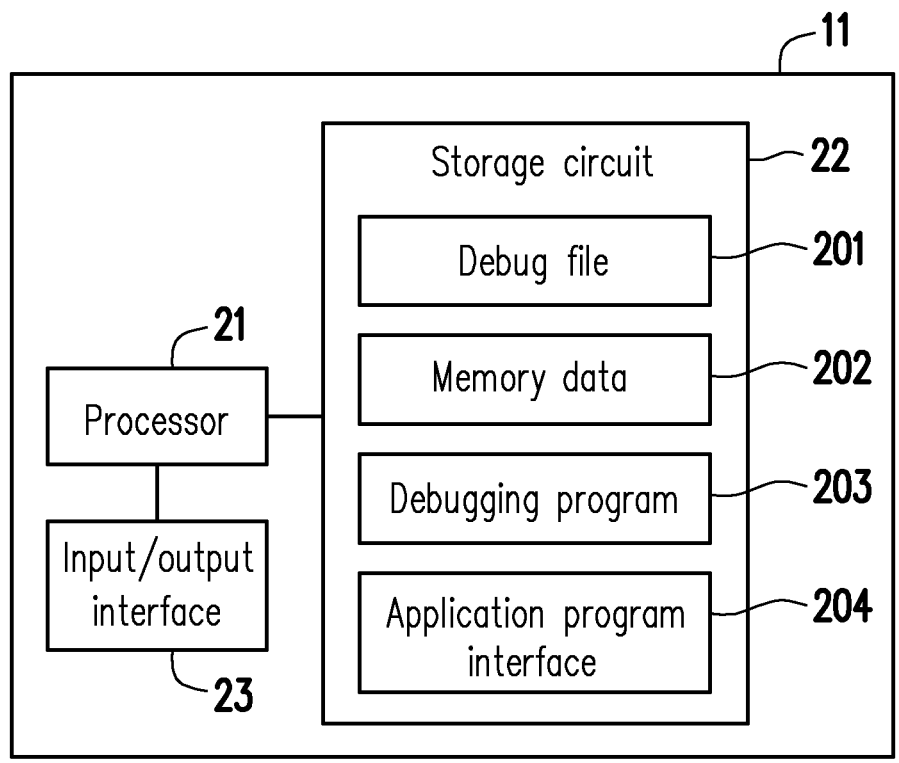
FIG. 2 is a schematic block diagram showing a host system according to an exemplary embodiment of the disclosure.

FIG. 2 is a schematic block diagram showing a host system according to an exemplary embodiment of the disclosure. With reference to FIG. 2, the host system 11 includes a processor 21, a storage circuit 22, and an input/output interface 23. The processor 21 is in charge of overall or partial operation of the host system 11. For example, the processor 21 may include a central processing unit (CPU), a graphic processing unit (GPU), any other programmable general-purpose or special-purpose microprocessor, a digital signal processor (DSP), a programmable controller, an application specific integrated circuit (ASIC), a programmable logic device (PLD), or other similar devices or a combination of these devices.

The storage circuit 22 is coupled to the processor 21 and is configured to store data. For example, the storage circuit 22 may include a hard disk drive (HDD) and/or a solid state drive. The input/output interface 23 is coupled to the processor 21 and is configured to receive or send signals. For example, the input/output interface 23 may include various connection interfaces such as a mouse, a keyboard, a touchpad, a screen, a speaker, a microphone, a network interface card, and/or a Universal Serial Bus (USB).

In an exemplary embodiment, a debug file 201, memory data 202, a debugging program 203, and an application program interface 204 are stored in the storage circuit 22. The debug file 201 contains debugging information related to the firmware in the memory storage device 12 of FIG. 1. The memory data 202 may be stored in the storage circuit 22 according to the memory data 101 of FIG. 1. The processor 21 may load the debug file 201 and the memory data 202 into the debugging program 203. After loading the debug file 201 and the memory data 202, the processor 21 may execute the debugging program 203 to automatically analyze the memory data 202. Then, the processor 21 may present an analysis result of the memory data 202 by the application program interface 204. According to this analysis result, the processor 21 may, automatically or with assistance by a debugger, check a status of the firmware in the memory storage device 12 (e.g., debugging).

In an exemplary embodiment, the processor 21 may generate the debug file 201 according to a source code. This source code carries a description message. For example, this description message may be configured to describe a declaration, a definition, or a function of at least a part of the source code. Notably, the debug file 201 may carry symbol information related to the description message in this source code.

Figures 3, 4:
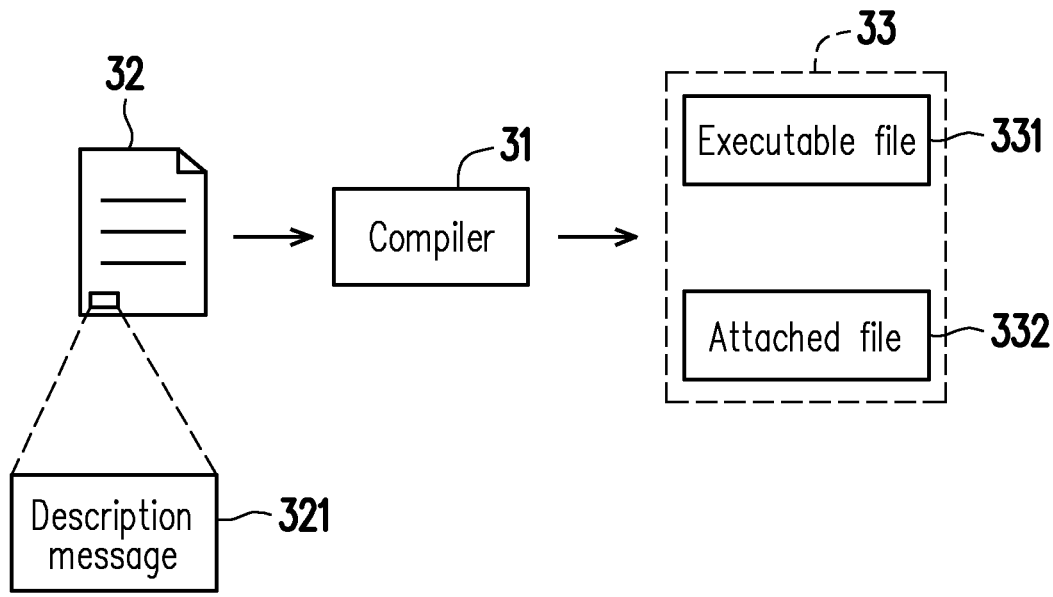
FIG. 3 is a schematic diagram showing generating a debug file according to a source code according to an exemplary embodiment of the disclosure.
FIG. 4 is a schematic diagram showing a description message according to an exemplary embodiment of the disclosure.

FIG. 3 is a schematic diagram showing generating a debug file according to a source code according to an exemplary embodiment of the disclosure. With reference to FIG. 3, in an exemplary embodiment, the processor 21 includes a compiler 31. The compiler 31 may be configured to process (e.g., compile) a source code 32 to generate a debug file 33. The debug file 33 may be same as or similar to the debug file 201 of FIG. 2. Notably, the source code 32 carries a description message 321. The description message 321 may be configured to describe a declaration, a definition, or a function of at least a part of codes in the source code 32.

In an exemplary embodiment, the debug file 33 includes an executable file 331 and an attached file 332. The executable file 331 and the attached file 332 are both generated by the compiler 31 processing the source code 32. The executable file 331 is a file presented in machine language (or assembly language) and may be regarded as a main program generated by compiling the source code 32. The attached file 332 is configured to carry symbol information related to the description message 321. In particular, the attached file 332 is not presented in machine language (or assembly language). In an exemplary embodiment, the attached file 332 may be regarded as a profile between the source code 32 and the executable file 331 presented in machine language (or assembly language). In an exemplary embodiment, the symbol information carried by the attached file 332 may be configured to associate (or map) the description message 321 to a specific symbol in the firmware of the memory storage device 12 of FIG. 1.

FIG. 4 is a schematic diagram showing a description message according to an exemplary embodiment of the disclosure. With reference to FIG. 4, a description message 401 may be included in the description message 321 of FIG. 3. The description message 401 may be configured to describe a declaration, a definition, or a function of at least a part of codes in the source code 32 of FIG. 3.

In an exemplary embodiment, the memory data 101 of FIG. 1 is obtained from reading at least one memory module in the memory storage device 12 by a simulation circuit coupled to the memory storage device 12. For example, the at least one memory module may include a volatile memory module and/or a non-volatile memory module. For example, the volatile memory module may include a dynamic random access memory (DRAM) module and/or a static random access memory (SRAM), and the non-volatile memory module may include a flash memory module. Besides, it is possible that the simulation circuit is not disposed in the host system 11.

In an exemplary embodiment, the simulation circuit may include an in-circuit emulator (ICE). The in-circuit emulator is coupled to a motherboard on which the memory storage device 12 is installed. After the memory storage device 12 executes the firmware therein, the in-circuit emulator may read the memory data 101 by a communication interface of the motherboard from the at least one memory module in the memory storage device 12. The memory data 101 read may be carried or transmitted to the host system 11 for analysis. In an exemplary embodiment, the host system 11 may also read the memory data 101 from the memory storage device 12 by reading devices in other forms or by the host system 11 per se, and the disclosure is not limited thereto.

Figure 5:
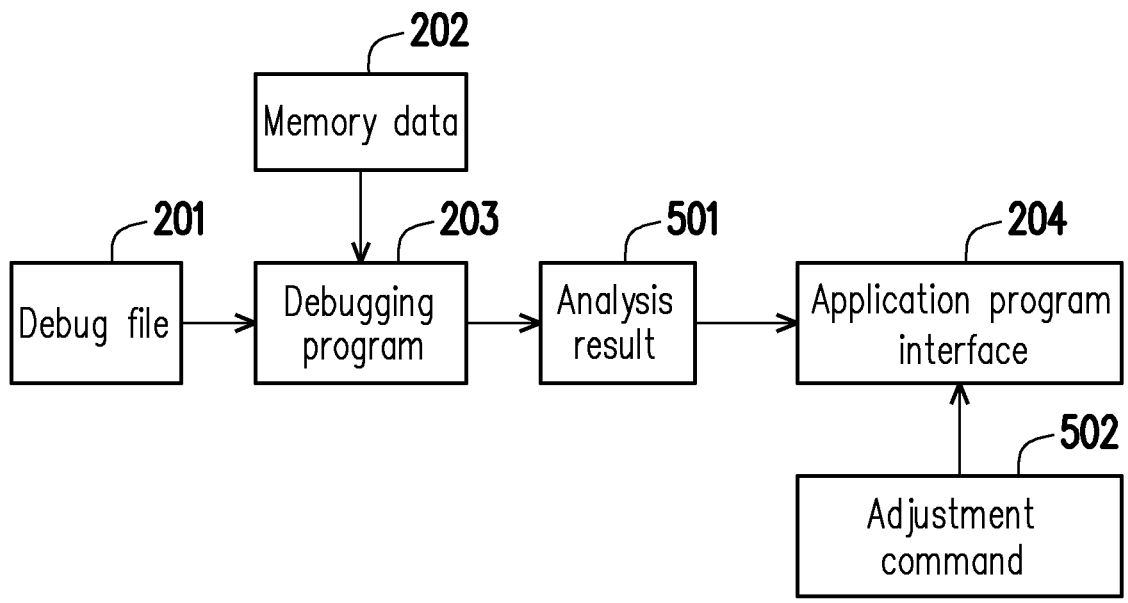
FIG. 5 is a schematic diagram showing a memory check operation according to an exemplary embodiment of the disclosure.

FIG. 5 is a schematic diagram showing a memory check operation according to an exemplary embodiment of the disclosure. With reference to FIG. 5, after the debug file 201 (e.g., the executable file 331 and the attached file 332 of FIG. 3) and the memory data 202 are loaded into debugging program 203, the debugging program 203 may analyze the memory data 202 and generate an analysis result 501 according to the debugging information related to the firmware in the memory storage device 12 of FIG. 1 in the debug file 201. The analysis result 501 may be presented by the application program interface 204, for example, presented on a display of the host system 11 of FIG. 1.

In an exemplary embodiment, the analysis result 501 may reflect the status of the firmware (e.g., abnormalities that may be present in the firmware) with assistance of the symbol information carried by the debug file 201. For example, after execution of the debugging program 203, the debugging program 203 may associate (or map) symbols corresponding to one or more firmware codes in the firmware with the symbol information in the debug file 201. According to this association result (or mapping result), the associated description (e.g., description of a declaration, a definition, or a function related to one code) originally recorded in the description message 321 of FIG. 3 may be presented in the application program interface 204.

In an exemplary embodiment, when the debugging program 203 detects an abnormal event corresponding to one firmware code in the memory storage device 12, the debugging program 203 may present the abnormal event (or the firmware code or memory location where the abnormal event occurs) and the associated description message in the application program interface 204 at the same time. In particular, similar to the description message in the source code (e.g., the description message 321 of FIG. 3), the description message presented in the application program interface 204 is presented to be human-readable, thereby facilitating error-locating and debugging by a debugger for the abnormal event.

In an exemplary embodiment, the debugging program 203 may receive an adjustment command 502 issued by a user by the application program interface 204. The adjustment command 502 may be input into the application program interface 204 by the input/output interface 23 of FIG. 2. The debugging program 203 may update at least a part of firmware codes in the firmware according to the adjustment command 502. For example, the debugger may issue the adjustment command 502 according to the abnormal event presented by the application program interface 204. The debugging program 203 may update the firmware code related to this abnormal event in the memory storage device 12 of FIG. 1 according to the adjustment command 502 in an attempt to eliminate this abnormal event.

Figure 6:
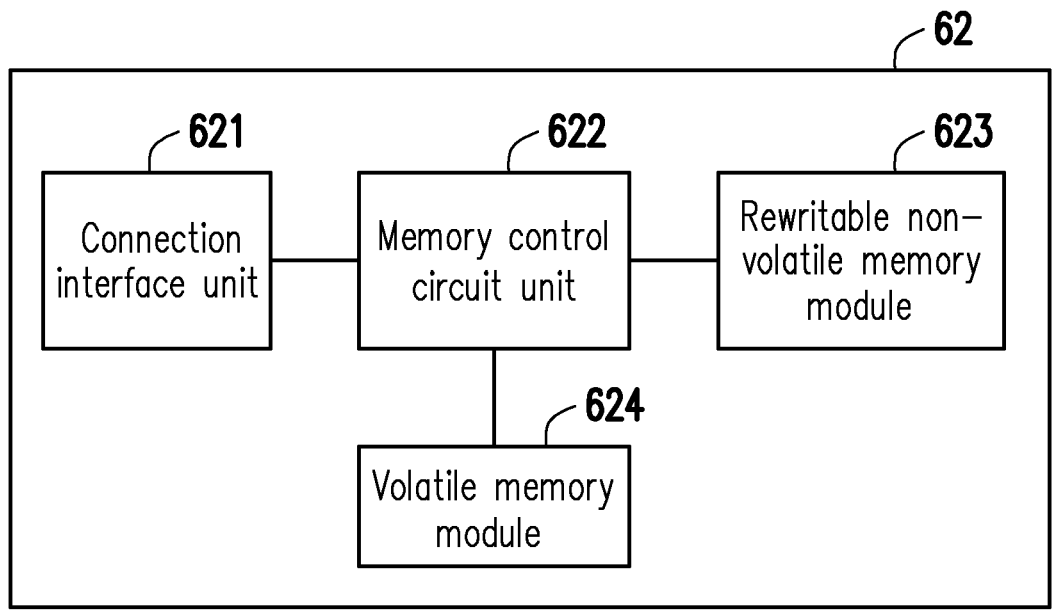
FIG. 6 is a schematic block diagram showing a memory storage device according to an exemplary embodiment of the disclosure.

FIG. 6 is a schematic block diagram showing a memory storage device according to an exemplary embodiment of the disclosure. With reference to FIG. 6, a memory storage device 62 may be same as or similar to the memory storage device 12 in FIG. 1. In an exemplary embodiment, the memory storage device 62 includes a connection interface unit 621, a memory control circuit unit 622, a rewritable non-volatile memory module 623, and a volatile memory module 624.

In an exemplary embodiment, the connection interface unit 621 is compliant with the Serial Advanced Technology Attachment (SATA) standard. However, it must be understood that the disclosure is not limited thereto. In an exemplary embodiment, the connection interface unit 621 may be also compliant with the Parallel Advanced Technology Attachment (PATA) standard, the Institute of Electrical and Electronic Engineers (IEEE) 1394 standard, the Peripheral Component Interconnect Express (PCI Express) standard, the USB standard, the SD interface Standard, the Ultra High Speed-I (UHS-I) interface standard, the Ultra High Speed-II (UHS-II) interface standard, the Memory Stick (MS) interface standard, the MCP interface standard, the MMC interface standard, the eMMC interface standard, the Universal Flash Storage (UFS) interface standard, the eMCP interface standard, the CF interface standard, the integrated device electronics (IDE) standard or other suitable standards. The connection interface unit 621 may be packaged with the memory control circuit unit 622 in one chip, or the connection interface unit 621 may be configured outside a chip including the memory control circuit unit 622.

The memory control circuit unit 622 is configured to execute multiple logic gates or control commands implemented in a hardware form or firmware form and performs operations such as writing, reading, and erasing of data in the rewritable non-volatile memory module 623 according to commands of the host system.

The rewritable non-volatile memory module 623 is coupled to the memory control circuit unit 622 and is configured to store data. The rewritable non-volatile memory module 623 may be a single-level cell (SLC) NAND flash memory module (i.e., a flash memory module that stores 1 bit in one memory cell), a multi-level cell (MLC) NAND flash memory module (i.e., a flash memory module that stores 2 bits in one memory cell), a triple-level cell (TLC) NAND flash memory module (i.e., a flash memory module that stores 3 bits in one memory cell), a quad-level cell (QLC) NAND flash memory module (i.e., a flash memory module that stores 4 bits in one memory cell), other flash memory modules, or other memory modules with the same properties.

Each memory cell in the rewritable non-volatile memory module 623 stores one or more bits with a change of a voltage (also referred to as threshold voltage hereinafter). Specifically, a charge trapping layer is present between a control gate and a channel of each memory cell. By applying a write voltage to the control gate, the number of electrons in the charge trapping layer may be changed, thereby changing the threshold voltage of the memory cell. This operation of changing the threshold voltage of the memory cell is also referred to as "writing data into the memory cell" or "programming the cell". As the threshold voltage changes, each memory cell in the rewritable non-volatile memory module 623 has multiple storage states. By applying a reading voltage, it may be determined which storage state one memory cell belongs to, thereby obtaining one or more bits stored in the memory cell.

The volatile memory module 624 is coupled to the memory control circuit unit 622 and is configured to temporarily store data. For example, the volatile memory module 624 may include a DRAM module and/or an SRAM module.

In an exemplary embodiment, the memory control circuit unit 622 may store the firmware code including the boot code in the rewritable non-volatile memory module 623. When the memory storage device 62 is in a turned-on state or other working state, the corresponding firmware code may be read to the volatile memory module 624 for execution. Besides, transient data generated by executing the firmware code is also temporarily stored in the volatile memory module 624. In an exemplary embodiment, the memory data 101 of FIG. 1 includes this transient data. In an exemplary embodiment, through an analytical process such as comparison of the information in the debug file 201 of FIG. 2 with the transient data, the corresponding abnormal event may be detected and displayed in the application program interface 204 of FIG. 2.

Figure 7:
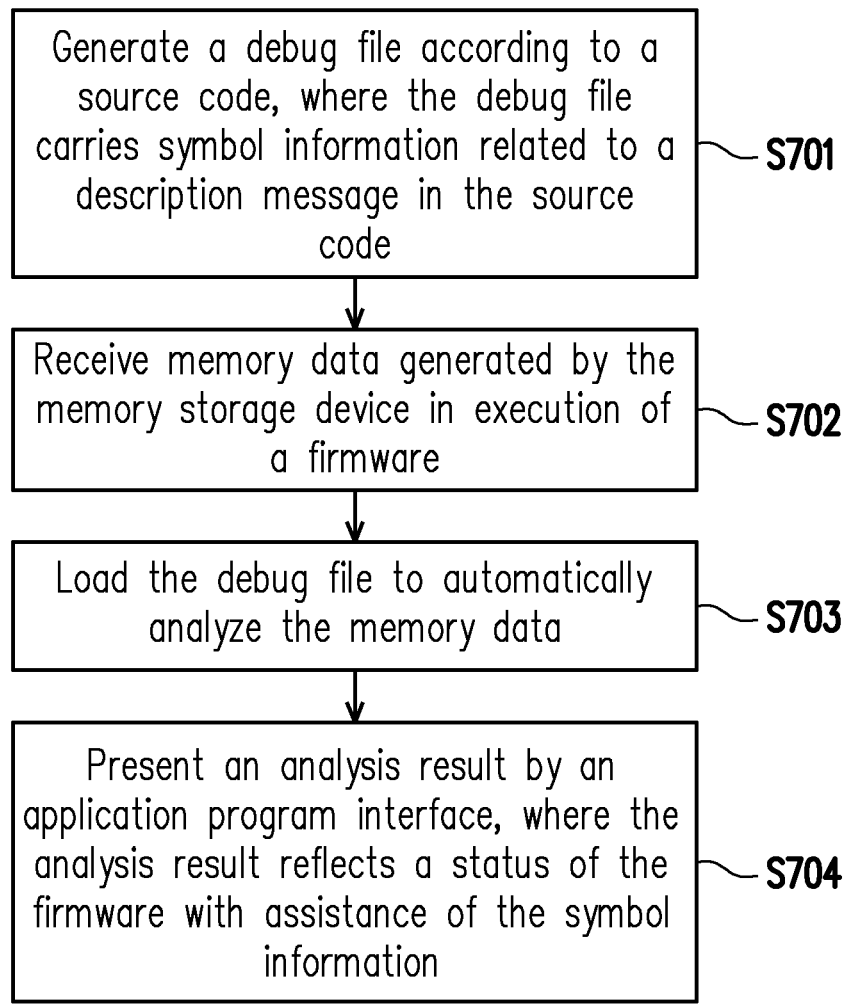
FIG. 7 is a flowchart showing a memory check method according to an exemplary embodiment of the disclosure.

FIG. 7 is a flowchart showing a memory check method according to an exemplary embodiment of the disclosure. With reference to FIG. 7, in step S701, a debug file is generated according to a source code. The debug file carries symbol information related to a description message in the source code. In step S702, memory data generated by a memory storage device in execution of a firmware is received. In step S703, the debug file is loaded to automatically analyze the memory data. In step S704, an analysis result is presented by an application program interface, where the analysis result reflects a status of the firmware with assistance of the symbol information.

However, each step in FIG. 7 has been described in detail as above, and will not be repeatedly described herein. Notably, each step may in FIG. 7 may be implemented as multiple codes or circuits, and the disclosure is not limited thereto. Besides, the method of FIG. 7 may be used in accompany with the above exemplary embodiments, and may as well be used alone, and the disclosure is not limited thereto.

In summary of the foregoing, the debug file may be generated according to the source code. In particular, the debug file may carry symbol information related to the description message in the source code. After the memory data generated by the memory storage device in execution of the firmware is received, the debug file may be executed to automatically analyze the memory data. Next, the analysis result may be presented by the application program interface to reflect the status of the firmware with assistance of the symbol information. Thereby, work efficiency in performing a memory check on the memory storage device is increased.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory check method adapted to check a firmware in a memory storage device, wherein the memory check method comprises:
    generating a debug file according to a source code, wherein the debug file carries symbol information related to a description message in the source code, wherein the description message is configured to describe a declaration, a definition, or a function of at least a part of codes in the source code;
    receiving a memory data generated by the memory storage device in execution of the firmware;
    loading the debug file to automatically analyze the memory data; and
    presenting an analysis result by an application program interface, wherein the analysis result reflects a status of the firmware with assistance of the symbol information,
    wherein the status of the firmware includes an anomaly in the firmware,
    wherein generating the debug file according to the source code comprises:
    processing the source code by a compiler to generate the debug file, wherein the symbol information is not presented in machine language or assembly language.

2. The memory check method according to claim 1, wherein the symbol information is configured to associate the description message in the source code with a specific symbol in the firmware.

3. The memory check method according to claim 1, wherein the memory data is obtained from reading at least one memory module in the memory storage device by a simulation circuit coupled to the memory storage device.

4. The memory check method according to claim 3, wherein the simulation circuit comprises an in-circuit emulator.

5. The memory check method according to claim 1, wherein the memory data is received by a host server from the memory storage device.

6. The memory check method according to claim 1, further comprising:
receiving an adjustment command issued by a user by the application program interface; and
updating at least a part of firmware codes in the firmware according to the adjustment command.

7. A memory check device adapted to check a firmware in a memory storage device, wherein the memory check device comprises:
a storage circuit configured to store a source code and a debug file; and
a processor coupled to the storage circuit,
wherein the processor is configured to generate the debug file according to the source code, and the debug file carries symbol information related to a description message in the source code, wherein the description message is configured to describe a declaration, a definition, or a function of at least a part of codes in the source code,
the processor is further configured to receive a memory data generated by the memory storage device in execution of the firmware,
the processor is further configured to load the debug file to automatically analyze the memory data, and
the processor is further configured to present an analysis result by an application program interface, wherein the analysis result reflects a status of the firmware with assistance of the symbol information, wherein the status of the firmware includes an anomaly in the firmware;
wherein generating the debug file according to the source code comprises:
processing the source code by a compiler to generate the debug file, wherein the symbol information is not presented in machine language or assembly language.

8. The memory check device according to claim 7, wherein the symbol information is configured to associate the description message in the source code with a specific symbol in the firmware.

9. The memory check device according to claim 7, wherein the memory data is obtained from reading at least one memory module in the memory storage device by a simulation circuit coupled to the memory storage device.

10. The memory check device according to claim 9, wherein the simulation circuit comprises an in-circuit emulator.

11. The memory check device according to claim 7, wherein the memory check device further comprises an input/output interface, and the input/output interface is coupled to the processor, and
the processor receives the memory data by the input/output interface from the memory storage device.

12. The memory check device according to claim 7, wherein the processor is further configured to receive an adjustment command issued by a user by the application program interface, and
the processor is further configured to update at least a part of firmware codes in the firmware according to the adjustment command.

13. A memory check system, comprising:
a memory storage device having a firmware; and
a host server coupled to the memory storage device,
wherein the host server is configured to generate a debug file according to a source code, and the debug file carries symbol information related to a description message in the source code, wherein the description message is configured to describe a declaration, a definition, or a function of at least a part of codes in the source code,
the host server is further configured to receive a memory data generated by the memory storage device in execution of the firmware,
the host server is further configured to load the debug file to automatically analyze the memory data, and
the host server is further configured to present an analysis result by an application program interface, wherein the analysis result reflects a status of the firmware with assistance of the symbol information, wherein the status of the firmware includes an anomaly in the firmware,
wherein generating the debug file according to the source code comprises:
processing the source code by a compiler to generate the debug file, wherein the symbol information is not presented in machine language or assembly language.

14. The memory check system according to claim 13, wherein the symbol information is configured to associate the description message in the source code with a specific symbol in the firmware.

15. The memory check system according to claim 13, wherein the memory data is obtained from reading at least one memory module in the memory storage device by a simulation circuit coupled to the memory storage device.

16. The memory check system according to claim 15, wherein the simulation circuit comprises an in-circuit emulator.

17. The memory check system according to claim 13, wherein the memory data is received by the host server from the memory storage device.

18. The memory check system according to claim 13, wherein the host server is further configured to receive an adjustment command issued by a user by the application program interface, and
the host server is further configured to update at least a part of firmware codes in the firmware according to the adjustment command.

* * * * *